May 8, 1934.   C. H. LEIS ET AL   1,958,089
BEARING ELEMENT
Filed March 7, 1931
Fig. 1.
Fig. 2.
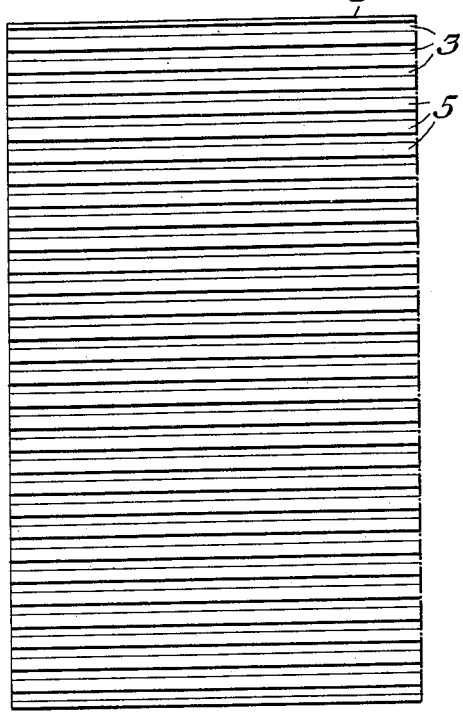
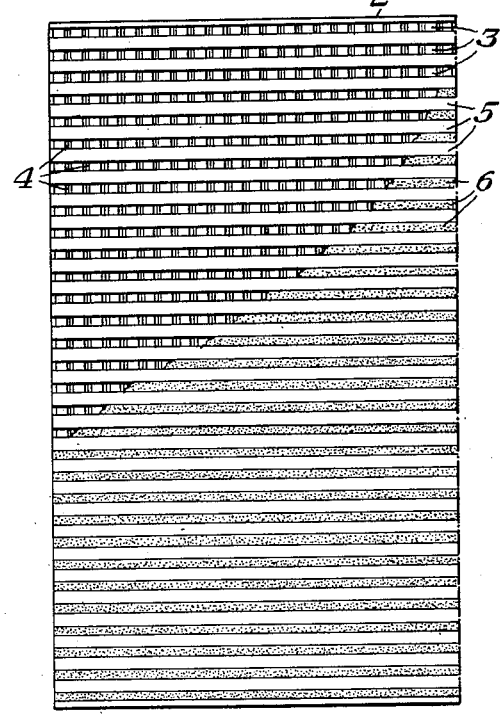
Fig. 3.
Fig. 4.
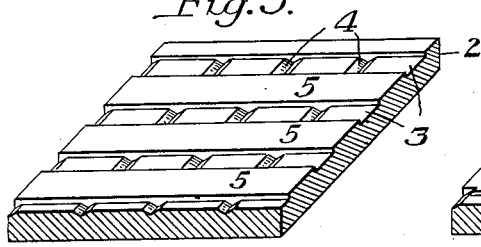
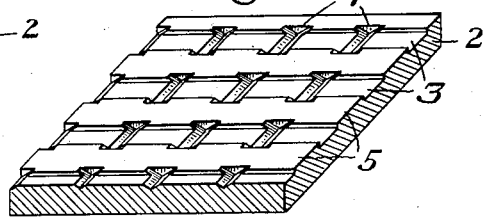
Fig. 5.
Fig. 6.
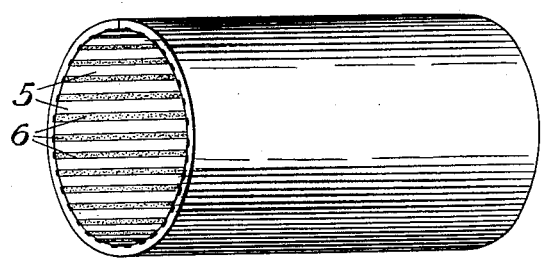
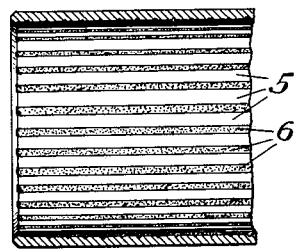
Fig. 7.
INVENTORS
Carl H. Leis
Louis Sandler
by their attorney Patented May 8, 1934

1,958,089

UNITED STATES PATENT OFFICE 1,958,089

BEARING ELEMENT

Carl H. Leis and Louis Sandler, New Castle, Pa., assignors to Johnson Bronze Company, New Castle, Pa., a corporation of Pennsylvania Application March 7, 1931, Serial No. 520,853

9 Claims. (Cl. 308—239)

This invention relates to bushings and like bearing elements and to the manufacture thereof, and pertains particularly to sheet metal bushings having graphite or other lubricating or surfacing compound retained in the surface thereof.

Various bushings have been developed having small pockets or recesses in the bearing surface thereof which are filled with graphite compounds. It has also been proposed to form a bushing from sheet metal having continuous longitudinal grooves in the surface thereof into which graphite or other surfacing composition is packed, such bushings providing a greater area of graphite than can be obtained where the surface of the metal is provided with separated small pockets. It has heretofore been difficult, however, in that type of bushing having a continuous groove to effectively retain the graphite in the grooves. The graphite mix when it is applied to the grooved surface of the metal of course has to be pressed into the grooves and scraped clean of the surface of the metal. The graphite compound is highly viscous, and the scraping of the graphite from the surface of the sheet also tends to scrape it out of the grooves. Moreover, in such bushings, after they are formed, there is a tendency for the graphite under certain conditions to work out of the ends of the grooves, particularly when a burnishing tool is passed through the bushing.

The present invention contemplates the provision of means in the grooves for anchoring the graphite in the grooves and thereby make it practical to employ continuous longitudinal grooves rather than small pockets heretofore considered necessary, thus enabling the commercial manufacture of bushings having a graphited area considerably greater than that which is practical in bushings of the type most commonly used at the present time wherein the graphite is contained in small isolated pockets.

The invention may be readily understood by reference to the accompanying drawing in which Figure 1 represents a plan view of a portion of a piece of sheet bearing metal, such as bronze, copper or brass having longitudinally extending grooves therein;

Figure 2 is a view similar to Figure 1 showing further developments of the sheet, one portion of the view showing the manner in which the grooves are knurled to provide a roughened surface forming an anchorage in the grooves for the graphite or other lubricating or surfacing compound, another portion of the view showing the grooves completely filled with the graphite;

Figure 3 is a fragmentary perspective view of a portion of the strip after it has been grooved and knurled;

Figure 4 is a view similar to Figure 3 in which a different type of knurling is employed so as to form irregularities in the sides of the grooves;

Figure 5 is a perspective view of a finished bushing embodying our invention;

Figure 6 is a section through the bushing of Figure 5 showing the bushing after it has been chamfered by the application of a chamfering tool to the end thereof; and Figure 7 is a modification representing a section on a large scale through a strip in which still another form of irregularity is provided in the bottom of the groove for anchoring the graphite in the groove.

It will be understood that the drawing is merely illustrative of the invention and that the sheet metal is shown in greatly exaggerated dimensions, as ordinarily the metal employed is much thinner and the grooves therefore of less depth.

According to the present invention, a piece of metal is first provided with a series of parallel grooves therein. These grooves run in a direction such that when the flat piece of metal is rolled up into cylindrical form the grooves will extend in the direction of the longitudinal axis of the bushing.

In order to provide anchorage for the graphite against movement longitudinally of the grooves, irregularities of various types may be formed in the bottoms or the sides of the grooves or in both the bottom and the sides by means of which a substantially interlocking engagement is produced between the graphite which is subsequently introduced into the grooves.

In Figure 2 we have shown the bottoms of the grooves as being knurled, slight transversely extending dents being formed in the bottoms of these grooves. In the drawing 2 designates the sheet of metal; 3 are the parallel grooves; and 4 are the dents in the bottom of the groove produced by knurling the metal. After the grooves have been knurled or dented in this manner a graphite paste is packed into the grooves and baked. In order that the bushing shall be of uniform diameter it is of course desirable that the graphite shall be flush with the surface of the metal, exposing the ribs 5 between the graphite filled grooves. The graphite filling is designated 6.

The dents or irregularities in the bottom of the grooves provide an anchorage for the graphite when it is pressed into the grooves, which anchorage prevents the graphite from becoming dislodged when the surface of the strip is scraped to remove the excess graphite. These irregularities or indentations also provide an interlocking engagement between the graphite and the metal after the graphite has been baked and hardened, whereby the graphite will not become easily dislodged in subsequent operations to which the metal is subjected, particularly in the operation of burnishing the finished bushing.

The sheet metal, after it has been filled with graphite and the graphite baked, is, if not previously cut to the proper size, then cut to the proper size to produce a bushing, and rolled up into cylindrical form in accordance with the practice which is common in the manufacture of sheet metal bushings. The bushing is then ready for use, but before it is used it is preferable to chamfer the ends thereof. The chamfering tool used is preferably one which does not cut the metal clean, but tends rather to wipe the ends of the ribs 5 slightly over the ends of the grooves 3, as shown in Figure 6. The bearing metal will flow under the action of the chamfering tool quite readily to close or partly close the grooves at the ends of the bushing. The chamfering of the bushing in this manner thus tends to close the ends of the grooves and prevent the graphite from breaking out at the ends of the bushings. When the bushing is applied to the bearing in which it is to be used, it is the usual practice to push a burnishing tool longitudinally through the bushing to expand it. The anchorage provided by the graphite serves to hold the graphite against slippage under the frictional drag of the burnishing tool.

The invention is not limited to the formation of any particular type of irregularity in the groove for anchoring the graphite or other lubricating or surfacing compound. As shown in Figure 4, the knurling operation may be so carried out as to form indentations 7 in the sides of the grooves as well as in the bottoms of the grooves, and obviously should it be desirable, these irregularities could be produced in the sides of the grooves only. Moreover, the irregularities do not have to be formed by knurling, although a knurling operation is extremely simple and practical.

In Figure 7 we have shown grooves 8 in a sheet of metal 9, the grooves being of non-uniform depth, the bottoms of the grooves undulating, and in this manner providing anchorage for the graphite which is subsequently filled into the grooves and baked therein.

While the invention is applicable to cylindrical bushings, the sheet metal may be used in flat or other shapes where a graphited surface is required.

While we have shown specific embodiments of the invention it will be understood that various modifications and changes may be made therein within the contemplation of the invention and under the scope of the following claims.

We claim:

1. A bearing strip having substantially straight longitudinally extending grooves therein extending continuously throughout the greater portion of the length of the strip, graphite in the grooves, and irregularities in a surface of the groove into which the graphite is molded, whereby an interlocking relation is established between the graphite and the metal, the surface of the metal between the grooves being smooth.

2. A bearing member comprising a metal sheet having substantially straight longitudinally extending grooves therein extending continuously throughout the greater portion of the length of the sheet, at least one wall of the grooves having irregularities therein, and graphite within the grooves and locked therein by said irregularities, the surface of the metal intermediate the grooves being smooth to provide a bearing surface.

3. A bearing member comprising a strip of bearing metal having substantially straight longitudinal grooves therein having depressions in at least one wall thereof, and a hardened mass of graphite molded into the grooves and into the depressions whereby the graphite is interlocked with the metal, the surface of the metal between the grooves being smooth and providing a bearing surface.

4. A bearing member comprising a sheet of bearing metal having parallel substantially straight grooves therein, the bottoms of the grooves being of irregular depth, and graphite molded into the grooves and filling them, the irregularities in the bottoms of the grooves forming an interlocking contact with the graphite to restrain the graphite against longitudinal displacement, the portions of the metal between the grooves being smooth and providing a bearing surface.

5. A bearing element comprising a strip of bearing metal having a plurality of substantially straight parallel grooves therein, indentations in the bottoms thereof, and graphite filling the grooves and the indentations, the surface of the metal between the grooves being smooth.

6. A bearing element comprising a strip of bearing metal having a plurality of substantially straight parallel grooves therein, indentations in the bottoms and sides thereof, and graphite filling the grooves and the indentations, the surface of the metal between the grooves being smooth to provide a bearing surface.

7. A bearing element comprising a strip of bearing metal having a plurality of substantially straight parallel grooves therein, indentations in the sides thereof, and graphite filling the grooves and the indentations, the surface of the metal between the grooves being smooth to provide a bearing surface.

8. A bearing member comprising a metal sheet having substantially straight parallel longitudinally extending grooves therein, one wall of the groove being undulatory, and a hardened mass of surfacing material filling the grooves and cooperating with said undulatory wall to form an interlocking relation between the surfacing material and the metal, the metal between the grooves having a smooth surface.

9. A bearing member formed from a blank of bearing metal having substantially straight grooves therein extending throughout the greater portion of the length of the blank, at least one wall of the groove being knurled to provide irregularities therein, and a mass of surfacing material filling the grooves and interlocked with the knurled surface thereof, whereby an anchorage for the surfacing compound is provided, the metal between the grooves having a smooth surface.

CARL H. LEIS.
LOUIS SANDLER.